(12) United States Patent
Saiki

(10) Patent No.: US 6,866,497 B2
(45) Date of Patent: Mar. 15, 2005

(54) MOLDING APPARATUS HAVING A PROJECTING BULGE LOCATED IN A DIE HALF

(75) Inventor: Shinichi Saiki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 226 days.

(21) Appl. No.: 10/167,309

(22) Filed: Jun. 11, 2002

(65) Prior Publication Data

US 2003/0020211 A1 Jan. 30, 2003

(30) Foreign Application Priority Data

Jun. 13, 2001 (JP) ........................................ 2001-178756

(51) Int. Cl.[7] .............................................. B29C 45/36
(52) U.S. Cl. .................... 425/185; 425/190; 425/192 R
(58) Field of Search ................................ 425/182, 185, 425/190, 192 R

(56) References Cited

U.S. PATENT DOCUMENTS 2,424,522 A * 7/1947 Wasserman ................. 228/250
2,566,817 A 9/1951 Yellin
4,202,235 A * 5/1980 Namiki et al. ................. 84/649

FOREIGN PATENT DOCUMENTS

| EP | 0 168 992 | 1/1986 |
| EP | 61202808 | 9/1986 |
| EP | 01206013 | 8/1989 |
| JP | 56-144918 | 11/1981 |

* cited by examiner

Primary Examiner—Tim Heitbrink
(74) Attorney, Agent, or Firm—Patterson, Thuente, Skaar & Christensen, P.A.

(57) ABSTRACT

A molding apparatus includes a first die having an exterior forming surface and a second die. When the apparatus is closed, the first and second dies define a cavity. A bulge projects from the exterior forming surface of the first die toward the second die. A core receiving section, or a recess, is formed in the second die. When forming a through hole in a molded product, a first core is provided in the core receiving section. The first core contacts the bulge when the molding apparatus is closed. When a groove is formed on an exterior surface of a molded product by the bulge of the exterior forming surface, a second core is provided in the core receiving position. The second core is separated from the exterior forming surface when the apparatus is closed.

4 Claims, 7 Drawing Sheets

MOLDING APPARATUS HAVING A PROJECTING BULGE LOCATED IN A DIE HALF

BACKGROUND OF THE INVENTION

The present invention relates to a molding apparatus and a method for using the molding apparatus.

In a typical automobile, the knobs of various switches having various functions are provided on the armrest of side doors. Even in the same type of vehicles, the number of the knobs varies according to the grade of each vehicle and to the sales channels. For example, in one grade of a vehicle, a certain knob is provided in the cover of the armrest, and in another grade, the knob is not provided. In this case, two types of covers are prepared. The cover of one type has a through hole for the knob, and the knob protrudes through the hole. The cover of the other type has no through hole for the knob, and the part that corresponds to the knob is closed. The type of the armrest cover is selected according to the grade of the vehicle so that substantially identical type of armrest can be used for both of a vehicle that has the knob and a vehicle that does not have the knob.

A typical molding apparatus and a method for using the molding apparatus for molding such covers are described below with reference to FIGS. 11 to 14(b).

As shown in FIGS. 11 and 12(a), the molding apparatus includes a stationary die 51 and a movable die 52. The molding apparatus is used for molding a first cover 56, which has a predetermined through hole, and a second cover 58, which does not have the predetermined through hole.

When molding the first cover 56, a first core 53 is used. When molding the second cover 58, a second core 54 is used.

A core receiving section 55, which is a recess, is formed in the stationary die 51. The cores 53 and 54 are selectively received by the core receiving section 55. When molding the first cover 56, which has the through hole, the first core 53 is located in the core receiving section 55 as shown in FIG. 11. The first core 53 is formed such that its distal surface 53a contacts the movable die 52.

In this state, a first cavity 57 is defined by the stationary die 51, a movable die 52, and the first core 53. The first cavity 57 is filled with a synthetic resin for molding the first cover 56.

When molding the second cover 58, which does not have the through hole, the second core 54 is provided in the core receiving section 55 as shown in FIG. 12(a). The second core 54 is formed such that the distal surface 54a is flush with an exterior forming surface 51a of the stationary die 51.

In this state, a second cavity 59 is defined by the stationary die 51, the moveable die 52, and the second core 54. The second cavity 59 is filled with a synthetic resin for molding the second cover 58. The surfaces of the covers 56, 58 that are fanned by the stationary die 51 are exterior surfaces 56a, 58a, which are seen by a driver and passengers of the vehicle.

The second cover 58, which is molded with the second core 54, has the following drawbacks. The exterior surface 58a of the second cover 58 is defined by the distal surface 54a of the second core 54 and the exterior forming surface 51a of the stationary die 51. Therefore, due to a small space created between the second core 54 and the stationary die 51 (the core receiving section 55), a square line 60 formed on the exterior surface 58a at a position corresponding to the periphery of the core 54. The second cover 58, which has the line 60, is hardly welcome by users. Therefore, there has been a demand for a cover having no line 60.

Accordingly, to make the line 60 less conspicuous, the following method has been known in the art.

In this method, a third core 61 is located in the core receiving section 55 as shown in FIG. 13(a). The third core 61 has a bulge 62 protruding from the periphery of the end surface 61a toward the movable die 52. The distal surface 61a of the third core 61, which is surrounded by the bulge 62, is located in a common plane with the exterior forming surface 51a of the stationary die 51. A cover molded by using the third core 61 will be referred to as a third cover 63.

A cavity 64 is defined by the stationary die 51, the movable die 52, and the third core 61. The cavity 64 is filled with synthetic resin for molding the third cover 63. As shown in FIG. 13(b), a groove 65 is formed on the exterior 63a of the third cover 63 by the bulge 62.

As a result, the line 60 (see FIGS. 12(a) and 12(b)) are not formed. Instead, the groove 65 is positively formed in the third cover 63 by the bulge 62 of the third core 61. The third cover 63 is therefore welcome by users.

However, since the bulge 62 is formed along the periphery of the third core 61, the stationary die 51 (the core receiving section 55) and the bulge 62 define a right angle as shown in FIG. 14(a). Therefore, the outer periphery of the groove 65 has an orthogonal cross-section. Further, if there is a space between the third core 61 and the stationary die 51 (the core receiving section 55), flash is formed at the periphery 66.

As a result, when a user touches the exterior surface 63a of the third cover 63 with fingers, the fingers get snagged at the periphery 66, which disturbs the user.

To reduce the discomfort experienced by users, a molding apparatus shown in FIG. 14(b) may be used. In this apparatus, the cross-section of the bulge 62 at the part contacting the stationary die 51 (the core receiving section 55) is formed arcuate so that the periphery 66 of the groove 65 is chamfered.

In this case, however, the bulge 62 is not formed along the periphery of the third core 61. Therefore, a side 62a of the bulge 62 that corresponds to the stationary die 51 is not flush with a surface 61b of the third core 61 that contacts the stationary die 51 (the core receiving section 55). This again forms a line 60 on the exterior surface 63a of the third cover about the groove 65.

SUMMARY OF THE INVENTION

Accordingly, it is an objective of the present invention to provide an apparatus for molding a product that has no lines formed by cores and does not disturb a user when the user touches the exterior. Another objective of the present invention is to provide a method for using a molding apparatus for easily molding such product and other type of products.

To achieve the foregoing and other objectives and in accordance with the purpose of the present invention, a molding apparatus having a first die, a second die, and a bulge is provided. The first die has an exterior forming surface. When the apparatus is closed, the first and second dies define a cavity. The bulge projects from the exterior forming surface of the first die. When the apparatus is closed, a projection is selectively formed on a section of the second die that corresponds to the bulge. When a through hole is formed in a molded product, the projection is formed on the second die. When a groove is formed on an exterior surface of a molded product by the bulge of the exterior forming surface, the projection is not formed on the second die.

The present invention is also applied to a method for using a molding apparatus, which includes a first die, a second die, and a bulge. The first die has an exterior forming surface. When the apparatus is closed, the first and second dies define a cavity. The bulge projects from the exterior forming surface of the first die. When a through hole is formed in a molded product, a projection that contacts the bulge is formed on a section of the second die that corresponds to the bulge. When a groove is formed on an exterior surface of a molded product by the bulge of the exterior forming surface, the projection is not formed on the second die.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A molding apparatus and method for using the molding apparatus according to a first embodiment of the present invention will now be described with reference to the drawings.

Figure 2:
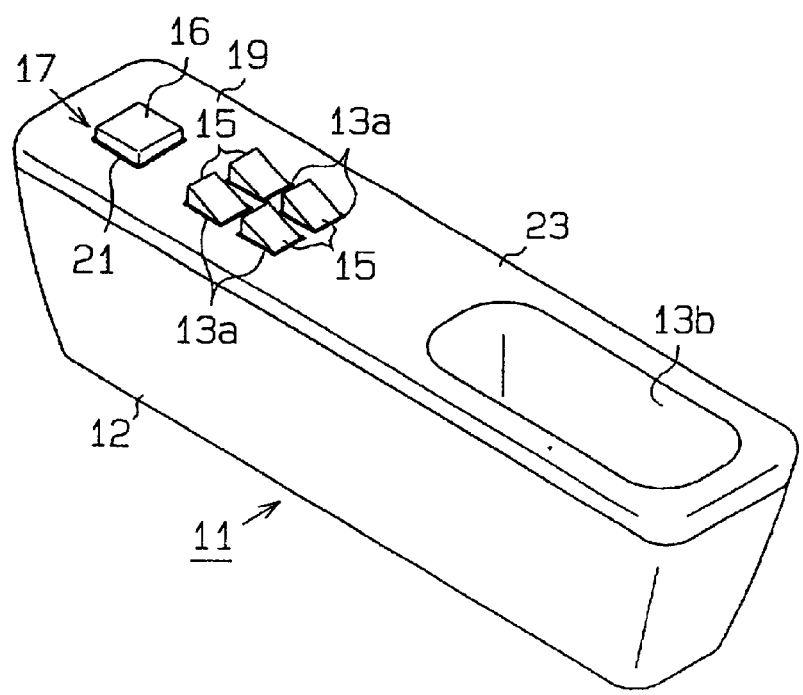
FIG. 2 is a perspective view illustrating an armrest having the cover molded by the molding apparatus shown in FIG. 1.
Figure 5:
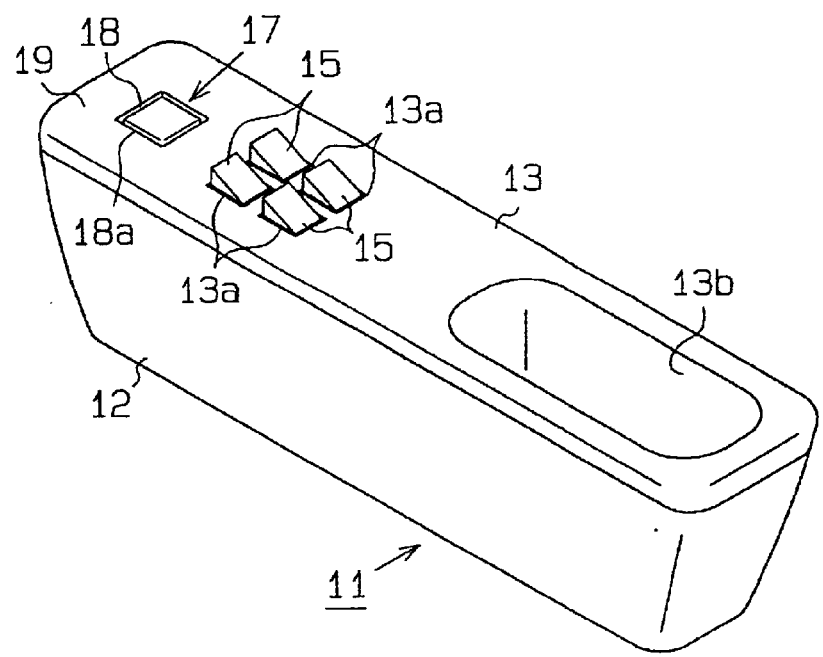
FIG. 5 is a perspective view illustrating an armrest having the cover molded by the molding apparatus of FIG. 4.

As shown in FIGS. 2 and 5, an armrest 11 provided on the vehicle side door at the driver's side has a case 12. According to the grade of the vehicle, a synthetic resin first cover 23 (see FIG. 2) or a synthetic resin second cover 13 (see FIG. 5) is attached to the case 12. Specifically, a vehicle of one grade has a mirror switch knob 16 for folding the outside mirrors (not shown) in the armrest 11. This type of vehicle uses the first cover 23, which has a through hole 21 for the mirror switch knob 16. A type of vehicle that does not have the mirror switch knob 16 uses the second cover 13, which does not have the through hole 21 for the mirror knob switch.

The first cover 23 and the second cover 13 are molded with a common molding apparatus.

Figure 1:
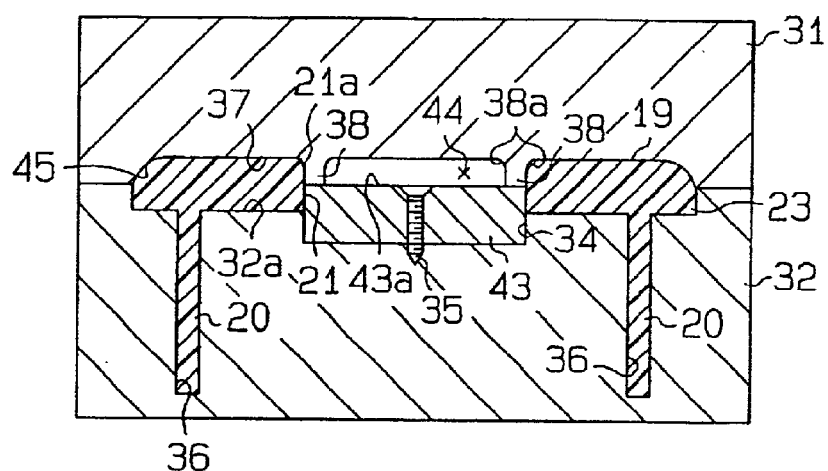
FIG. 1 is a cross-sectional view illustrating a molding apparatus for molding an armrest cover having a hole for mirror switch knob.
Figure 3:
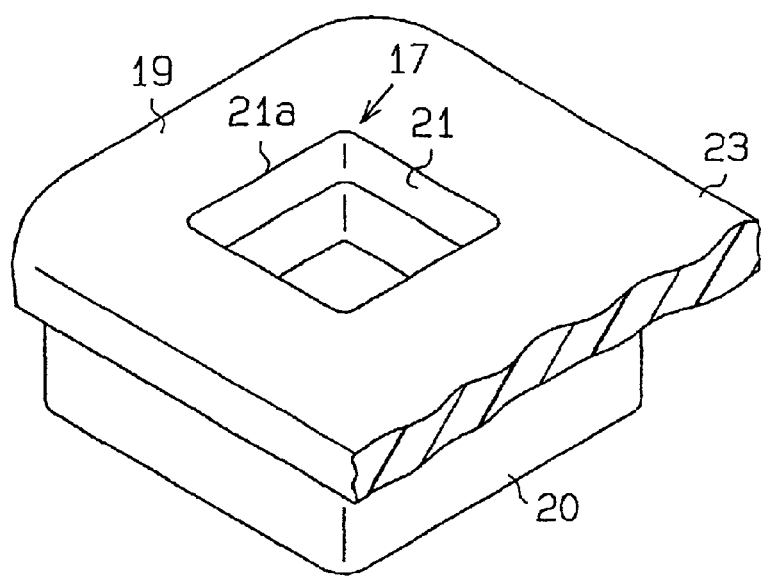
FIG. 3 is a partial perspective view illustrating the armrest of FIG. 2.

Referring to FIGS. 1 to 3, the shape and the molding method of the first cover 23 will be described.

Four through holes 13a and a pocket 13b are formed in the first cover 23. A power window switch unit (not shown) is accommodated in the case 12. The power window switch unit has four window switch knobs 15, each of which protrudes from the first cover 23 through one of the through holes 13a. Each window switch knob 15 corresponds to one of the side doors and is used for manipulating a window switch device (not shown). Each window switch device includes a roll-up switch and a roll-down switch and is manipulated for closing and opening the corresponding window.

Also, the first cover 23 has a mirror switch knob section 17, at which a mirror switch knob 16 is located. The mirror switch knob 16 is used for folding the outside mirrors (not shown).

As shown in FIGS. 2 and 3, the through hole 21 is formed at the mirror switch knob section 17 of the first cover 23. The through hole 21 has a constant cross-section along its entire length. A surface (upper surface) of the first cover 23 that is exposed to the passenger compartment will be referred to an exterior surface 19. A brim 21a of the through hole 21 at the exterior surface 19 is chamfered (see FIG. 1). As shown in FIGS. 1 and 3, a socket 20 is formed at the side opposite to the exterior surface 19 of the mirror switch knob section 13. A mirror switch unit (not shown) is fitted in the socket 20. The mirror switch unit has the mirror switch knob 16, which protrudes outside through the through hole 21.

The molding apparatus for molding the first cover 23 will now be described.

FIG. 1 is a cross-sectional view illustrating the molding apparatus when molding the first cover 23. The molding apparatus includes a first die (a stationary die 31 in this embodiment) and a second die (a movable die 32). A core receiving section 34, which is a core recess, is formed in the movable die 32. The core receiving section 34 has a square cross-section.

A first core 43 is fixed in the core receiving section 34. The core 43 forms a projection and has a square cross-section. The distal surface 43a of the first core 43, which faces the stationary core 31, is flat. A socket recess 36 for molding the socket 20 is formed in the movable die 32.

The recess formed in the stationary die 31 has an exterior forming surface 37 for forming the exterior surface 19 of the first cover 23. At a position on the exterior forming surface 37 that faces the core receiving section 34, a square bulge 38 is formed. The proximal portion 38a of the bulge 38 has an arcuate cross-section and is smoothly coupled to the exterior forming surface 37. The outer shape of the bulge 38 matches with the shape of periphery of the core receiving section 34.

The distal surface 43a of the first core 43 protrudes from the surface 32a of the stationary core 32. When the molding apparatus is closed, the distal surface 43a contacts the distal surface of the bulge 38.

The outer shape of the bulge 38 matches with the outer shape of the distal surface 43a of the first core 43, which faces the bulge 38.

The bulge 38 contacts the first core 43 without any space in between so that the through hole 21 is formed in the first cover 23. The proximal portion 38a of the bulge 38 chamfers the brim 21a of the through hole 21. The distal surface 43a of the first core 43 and part of the exterior forming surface 37 that is surrounded by the bulge 38 define a space 44. The first die 43 is fixed to the movable die 32 with a screw 35. The head of the screw 35 is formed flush with the distal surface 43s of the first core 43.

When molding the first cover 23, the first core 43 is fitted into the core receiving section 34 and fixed by the screw 35. Then, the stationary die 31 and the movable die 32 are closed. In this state, a first cavity 45 is defined by the stationary die 31, the movable die 32 and the first core 43. The shape of the first cavity 45 corresponds to the shape of the first cover 23. Synthetic resin is infused into the first cavity 45 through a runner and a gate (neither is shown) provided in the stationary die 31, so that the first cavity 45 is filled with the resin. After the resin is sufficiently hardened, the dies 31, 32 are opened. The first cover 23 is thus molded.

When molding the first cover 23 consecutively, the stationary die 31 and the movable die 32 are repeatedly closed and opened. When closing the molding apparatus, the first core 43 contacts the bulge 38.

Next, the shape and the molding method of the second cover 13 will be described with reference to FIGS. 4 to 6. The like or the same reference numerals are given to those components that are like or the same as the corresponding components of first cover 23.

The second cover 13 does not have the through hole 21 (see FIG. 3) for the mirror switch knob 16. The section that corresponds to the mirror switch knob 16 is closed.

Figure 6:
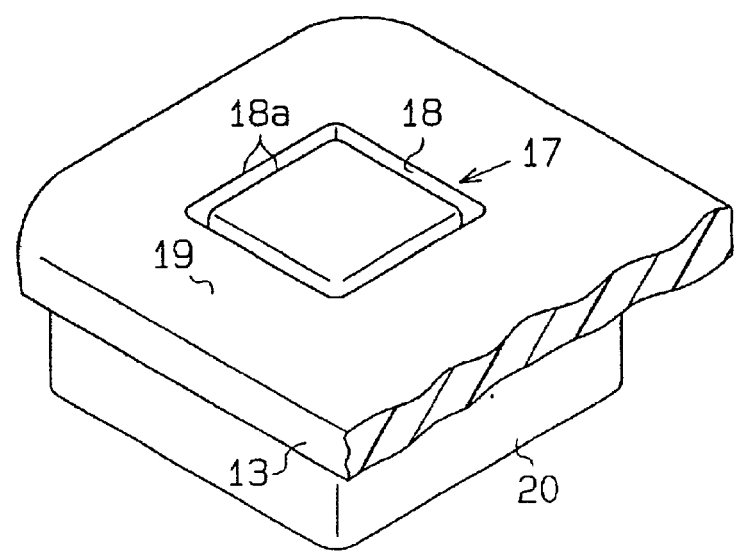
FIG. 6 is a partial perspective view illustrating the armrest of FIG. 5.

As shown in FIG. 6, a groove 18 is formed at the mirror switch knob section 17 of the second cover 13. The groove 18 is formed as a square. The brim 18a of the groove 18 is chamfered (see FIG. 4). The outer periphery of the groove 18 matches with the shape of the through hole 21 of the first cover 23.

The outer shape of the groove 18 is similar to but larger than the outer shape of the socket 20.

Figure 4:
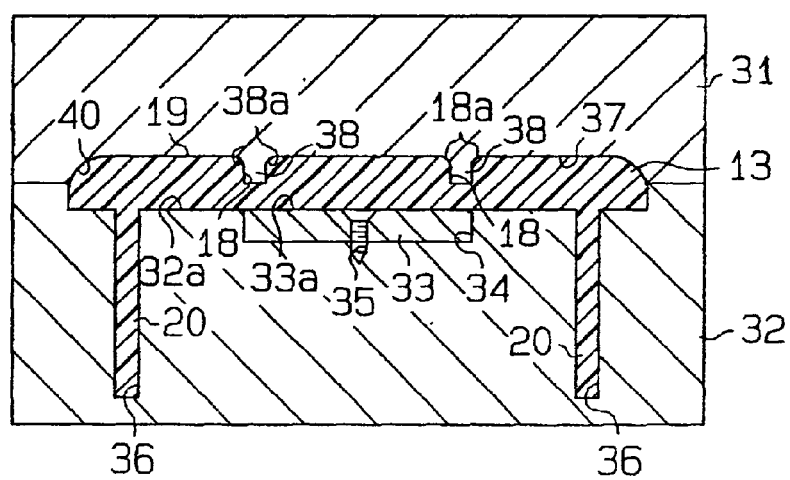
FIG. 4 is a cross-sectional view illustrating a molding apparatus for molding an armrest cover that does not have a hole for a mirror switch knob.

When molding the second cover 13, a second core 33 is used as shown in FIG. 4 instead of the first core 43.

The second core 33 is fitted into the core receiving section 34. The second core 33 has a substantially square cross-section. The distal surface 33a of the second core 33, which faces the stationary die 31, is flat and flush with the surface 32a of the movable die 32. Therefore, a predetermined space exists between the second core 33 and the bulge 38 of the stationary die 31 when the molding apparatus is closed.

The second core 33 is fixed to the movable die 32 by the screw 35. The head of the screw 35 is flush with the distal surface 33a of the second die 33.

When molding the second cover 13, the bulge 38 faces the periphery of the second core 33 and is used for forming the groove 18. As described above, the proximal portion 38a of the bulge 38 has an arcuate cross-section and is smoothly connected to the exterior forming surface 37. Thus, the brim 18a of the groove 18 is chamfered. The outer shape of the bulge 38 matches with the shape of the distal surface 33a of the second core 33, which faces the bulge 38.

When molding the second cover 13, the second core 33 is fitted into and secured to the core receiving section 34 by the screw 35. Then, the stationary die 31 and the movable die 32 are closed. The stationary die 31, the movable die 32, and the second core 33 define a second cavity 40. The shape of the second cavity 40 corresponds to the shape of the second cover 13. Synthetic resin is infused into the second cavity 40 through the runner and the gate formed in the stationary die 31, so that the second cavity 40 is filled with the resin. After the resin is sufficiently hardened, the dies 31, 32 are opened. The second cover 13 is thus molded.

As described above, the stationary die 31 and the movable die 32 are commonly used for molding the first and second covers 23, 13 by simply exchanging the first core 43 and the second core, which is thinner than the first core 43.

Unlike the prior art (see FIGS. 11 to 14), the second core 33 is not located on the exterior forming surface 37. Instead, the second core 33 is located in the core receiving section 34 in the movable die 32, which forms the surface that is opposite to the exterior surface 19. Therefore, even if there is a space between the second core 33 and the core receiving section 34 (movable die 32), the line formed on the molded product appears on the surface opposite to the exterior surface 19.

In other words, the line formed by the periphery of the second core 33 does not appear on the exterior surface 19, which improves the appearance of the second cover 13.

The brim 18a of the groove 18, which is located on the exterior surface 19, is chamfered. Therefore, when touched by a passenger, the groove 18 does not disturb the passenger.

In the embodiment of FIGS. 1 to 6, the bulge 38, which is formed on the exterior forming surface 37 of the stationary die 31, contacts the first die 43. Therefore, after the molding apparatus is repeatedly closed, the exterior forming surface 37 is not damaged. Even if the distal surface of the bulge 38 may be damaged due to repetitive contacts with the first core 43. However, since the distal surface of the bulge 38 forms the bottom of the groove 18, and the bottom of the groove 18 is not seen by users, flaws formed on the bottom scarcely degrades the appearance.

The brim 21a of the through hole 21 of the first cover 23 is chamfered by the proximal portion 38a of the bulge 38, which is smoothly connected to the exterior forming surface 37. Thus, compared to the case where the brim 21a has a right angle cross-section, the chamfered brim 21a does not disturb users when touched. Further, since the outer shape of the bulge 38 matches with the outer shape of the distal surface 43a of the first core 43, which faces the bulge 38, the through hole 21 of the first cover 23 has a constant cross-section along the entire length.

It should be apparent to those skilled in the art that the present invention may be embodied in many other specific forms without departing from the spirit or scope of the invention. Particularly, it should be understood that the invention may be embodied in the following forms.

Figure 7:
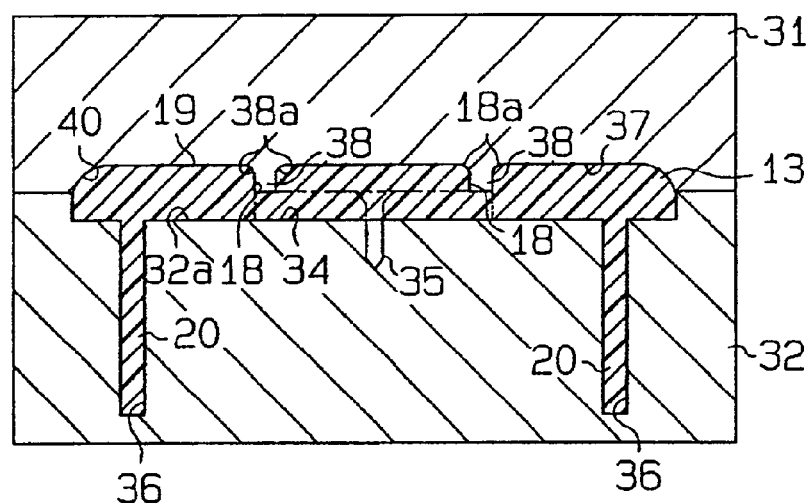
FIG. 7 is a cross-sectional view illustrating a molding apparatus for molding an armrest cover that has no hole for mirror switch knob according to another embodiment.

In the embodiment of FIGS. 1 to 6, the core receiving section 34 is a recess formed in the movable die 32. However, as shown in FIG. 7, the core receiving section 34 may be a flat section defined on the movable die 32.

In this case, a threaded hole is formed in the core receiving section 34. When molding the second cover 13, no core is provided on the core receiving section 34 and the threaded hole is filled by a screw. When molding the first cover 23, a first core 43 is secured to the core receiving section 34 by a screw 35 as illustrated by broken line in FIG. 7. The first core 43 contacts the bulge 38 on the exterior forming surface 37 when the molding apparatus is closed.

In the embodiment of FIGS. 1 to 6, the two cores 43, 33 having different thicknesses are selectively used for molding the first and second covers 23, 13. Instead of preparing two different cores, cores of one type may be prepared. In this case, the number of the cores is changed according to which of the covers 23, 13 is molded.

Figure 8:
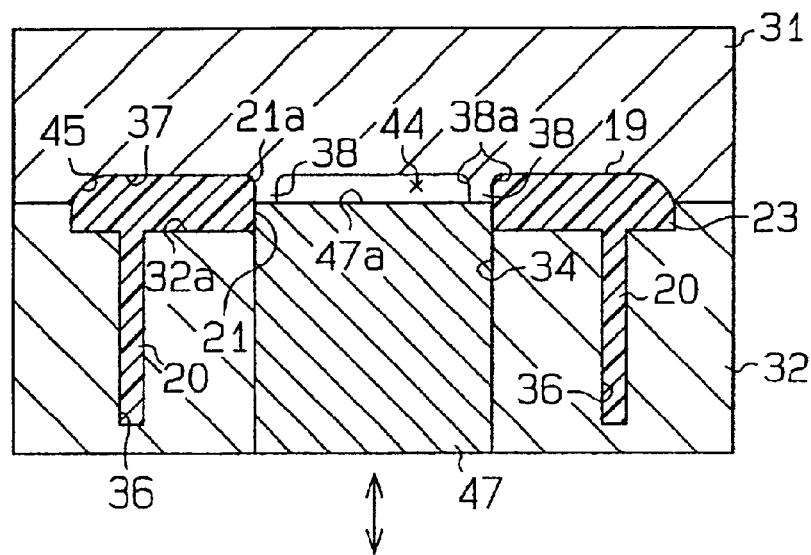
FIG. 8 is a cross-sectional view illustrating a molding apparatus for molding an armrest cover according to another embodiment.

Instead of using two different cores 43, 33, a retractable core 47 may be used as shown in FIG. 8. In this case, the core receiving section 34 is a through hole extending through the movable die 32 and the retractable core 47 is slidably provided in the through hole. The projection is formed by protruding the retractable core 47. When molding the first cover 23, the retractable core 47 is projected toward the stationary die 31 such that the distal surface 47a contacts the distal surface of the bulge 38. When molding the second cover 13, the retractable core 47 is retracted into the through hole so that the distal surface 47a is separated from the bulge 38.

In the embodiment of FIGS. 1 to 6, the distal portion 38a of the bulge 38 has an arcuate cross-section so that the bulge 38 is smoothly connected to the exterior forming surface 37. However, the distal portion 38a may be formed differently. Even in this case, the cores 43, 33 are not located on the exterior forming surface 37. Therefore, unlike the prior art, no flash is formed at the brim 21a, 18a of the through hole 21 and the groove 18 of the molded covers 23, 13. Thus, when a user touches the exterior surface 19, the use is not disturbed.

In the embodiment of FIGS. 1 to 6, the covers 23, 13, which are used for the armrest 11 of a vehicle's side door, are molded by the molding apparatus. However, the panel member of an instrument panel may be molded by the molding apparatus. A typical instrument panel has several switch knobs having different functions. The number of the knobs is different according to the grade of the vehicle and the sales channel.

In the embodiment of FIGS. 1 to 6, the exterior forming surface 37 is provided on the stationary die 31, and the core receiving section 34 is provided on the movable die 32. However, the core receiving section 34 may be located on the stationary die 31 and the exterior forming surface 37 is provided on the movable die 32. In this case, the movable die 32 functions as the first die, and the stationary die 31 functions as the second die.

In the embodiment of FIGS. 1 to 6, the distal surface 33a of the second core 33 is flush with the surface 32a of the movable die 32. However, the distal surface 33a may protrude from the surface 32a as long as there is a predetermined distance between the bulge 38 of the exterior forming surface 37 and the distal surface 33a.

In the embodiment of FIGS. 1 to 6, the head of the screw 35 may protrude from the distal surfaces 43a, 33a of the cores 43, 33.

In the embodiment of FIGS. 1 to 6, the outer shape of the bulge 38 need not be matched with the peripheral shape of the distal surfaces 43a, 33a of the cores 43, 33 and the outer shape of the core receiving section 34.

Figure 9:
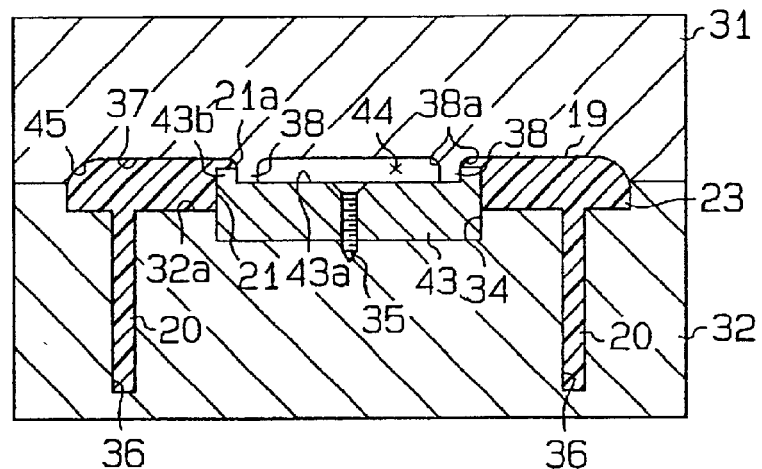
FIG. 9 is a cross-sectional view illustrating a molding apparatus for molding an armrest cover having a hole for mirror switch knob according to another embodiment.

In the embodiment of FIGS. 1 to 6, the flat distal surface 43a of the first core 43 contacts the entire distal surface of the bulge 38 when molding the first cover 23. However, the molding apparatus may have the following structures. As shown in FIG. 9, the size of the distal surface 43a of the first core 43 and the core receiving section 34 may be greater than the size of the bulge 38, and an engaging bulge 43b may be formed along the periphery of the first core 43. The bulge 43b has a square cross-section and protrudes toward the stationary core 31. When the molding apparatus is closed, the engaging bulge 43b fitted about the bulge 38. The first core 43 is engaged with the bulge 38 when the distal surface and the outer surface of the bulge 38 contact the distal surface 43a and the inner surface of the bulge 43b of the first core 43. Alternatively, only the outer surface of the bulge 38 may contact the inner surface of the engaging bulge 43b.

Figure 10:
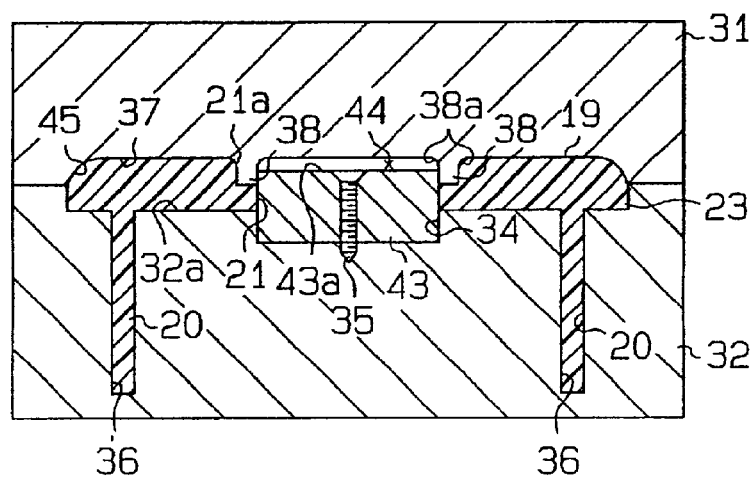
FIG. 10 is a cross-sectional view illustrating a molding apparatus for molding an armrest cover having a hole for mirror switch knob according to another embodiment.
Figure 11:
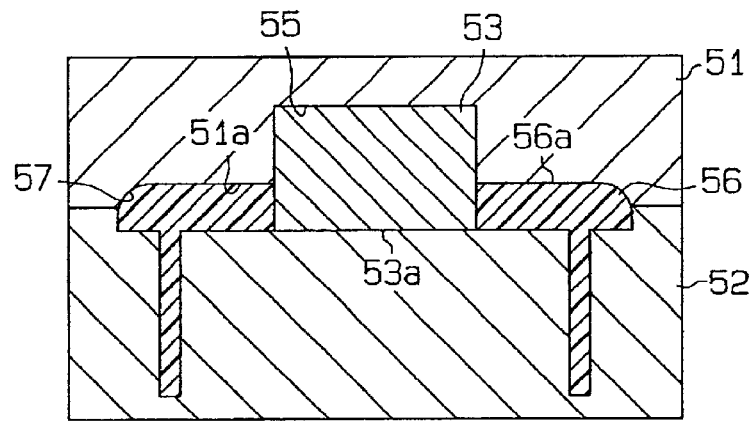
FIG. 11 is a cross-sectional view illustrating a prior art molding apparatus for molding an armrest cover having a predetermined through hole.
Figure 12A:
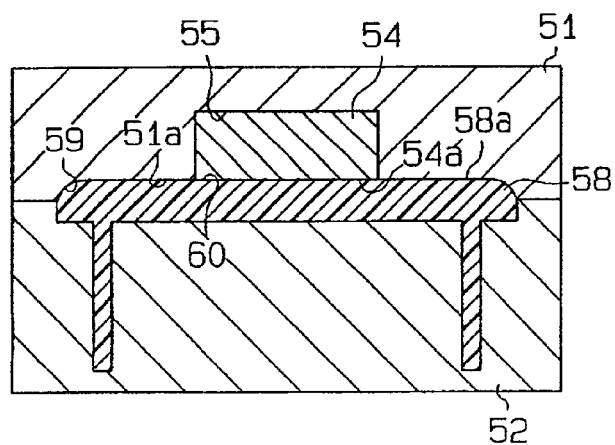
FIG. 12(a) is a cross-sectional view showing the molding apparatus of FIG. 11 when forming an armrest cover that does not have the predetermined through hole.
Figure 12B:
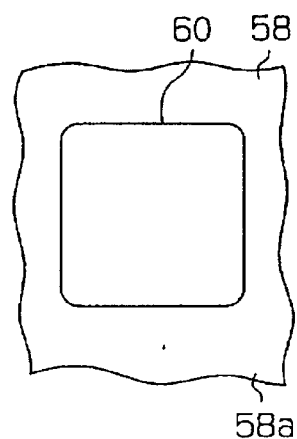
FIG. 12(b) is a partial plan view illustrating the cover formed by the molding apparatus of FIG. 12(a)
Figure 13A:
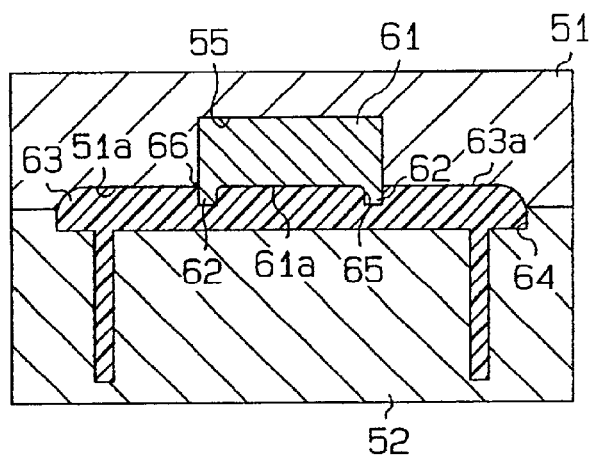
FIG. 13(a) is cross-sectional view illustrating another prior art molding apparatus for molding an armrest cover that does not have the predetermined through hole.
Figure 13B:
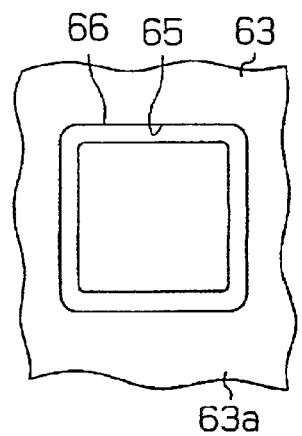
FIG. 13(b) is a partial plan view illustrating the cover molded by the molding apparatus of FIG. 13(a)
Figure 14A:
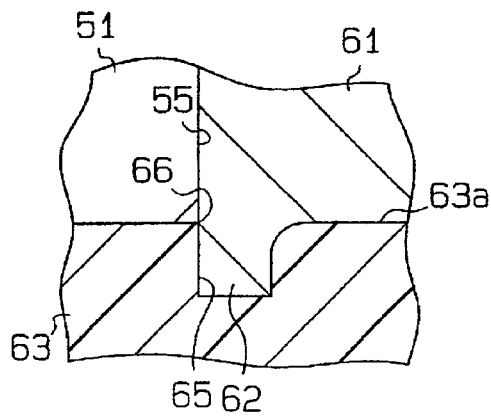
FIG. 14(a) is a partial cross-sectional view illustrating a bulge formed on the core of FIG. 13(a)
Figure 14B:
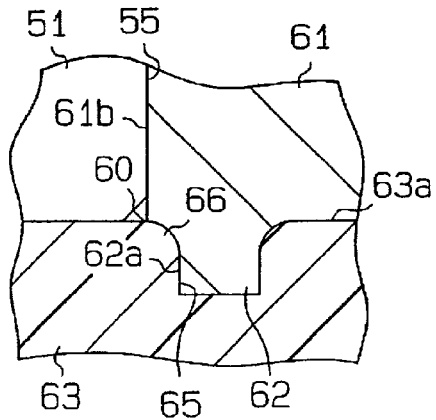
FIG. 14(b) is a partial cross-sectional view illustrating a bulge formed in another prior art core.

As shown in FIG. 10, the shape of the periphery of the distal surface 43a and the shape of the core receiving section may match with the inner shape of the bulge 38. When the molding apparatus is closed, the distal portion of the first core 43 fits in the bulge 38. In this case, the first core 43 is engaged with the bulge 38 when the side surface of the first core 43 contacts the inner surface of the bulge 38.

In the embodiment of FIGS. 1 to 6, the shape of the proximal portion of the first core 43, which fits in the core receiving section 34, may be different from the shape of the distal portion of the first core 43, which contacts the bulge 38. As long as the outer shape of the distal portion matches with that of the bulge 38, the through hole 21 is readily formed. Alternatively, a projection may be formed in the central section of the distal surface 43a of the first core 43 so that the projection fills the space 44 surrounded by the bulge 38 when the molding apparatus is closed.

Therefore, the present examples and embodiments are to be considered as illustrative and not restrictive and the invention is not to be limited to the details given herein, but may be modified within the scope and equivalence of the appended claims.

What is claimed is:

1. A molding apparatus comprising:

a first die having an exterior forming surface;

a second die that has a core receiving section having a support surface that can support a core, wherein, when the apparatus is closed, the first and second dies define a cavity; and a bulge projecting from the exterior forming surface of the first die, wherein the bulge is positioned opposite die support surface;

wherein, when the apparatus is closed, a projection is selectively formed on the second die by providing a core at the core receiving section such that the core is supported by the support surface of the core receiving section, the projection being located on a section of the second die that corresponds to the bulge; and wherein, when a through hole is formed in a molded product, the projection is formed on the second die, and wherein, when a groove is formed on an exterior surface of a molded product by the bulge of the exterior forming surface, the projection is not formed on the second die.

2. The molding apparatus according to claim 1, wherein the core receiving section is a recess and the core is a first core, wherein the projection is formed by providing the first core in the recess, wherein, when the groove is formed, a second core is provided in the recess, and wherein the second core is separated from the exterior forming surface when the molding apparatus is closed.

3. The molding apparatus according to claim 2, wherein the outer shape of the first core, which faces the bulge, matches with the outer shape of the bulge.

4. The molding apparatus according to claim 1, wherein the proximal end of the bulge has an arcuate cross-section.

* * * * *